United States Patent
Takesue et al.

(10) Patent No.: US 8,280,552 B2
(45) Date of Patent: Oct. 2, 2012

(54) POWER ASSIST DEVICE AND ITS CONTROL METHOD

(75) Inventors: Naoyuki Takesue, Hino (JP); Hideo Fujimoto, Nagoya (JP)

(73) Assignees: Toyota Jidosha Kabushiki Kaisha, Toyota-shi (JP); Nagoya Institute of Technology, Nagoya-shi (JP)

( * ) Notice: Subject to any disclaimer, the term of this patent is extended or adjusted under 35 U.S.C. 154(b) by 447 days.

(21) Appl. No.: 12/677,652

(22) PCT Filed: Sep. 9, 2008

(86) PCT No.: PCT/JP2008/066212
§ 371 (c)(1),
(2), (4) Date: Mar. 11, 2010

(87) PCT Pub. No.: WO2009/034962
PCT Pub. Date: Mar. 19, 2009

(65) Prior Publication Data
US 2010/0262291 A1 Oct. 14, 2010

(30) Foreign Application Priority Data
Sep. 12, 2007 (JP) .................................. 2007-237034

(51) Int. Cl.
*B25J 13/08* (2006.01)

(52) U.S. Cl. ........................................ 700/260; 901/2

(58) Field of Classification Search .................. 700/213, 700/255, 258, 260, 262; 901/2, 19, 20, 46
See application file for complete search history.

(56) References Cited

U.S. PATENT DOCUMENTS
6,430,473 B1 * 8/2002 Lee et al. ...................... 700/245
(Continued)

FOREIGN PATENT DOCUMENTS
JP 8-241107 A 9/1996
(Continued)

OTHER PUBLICATIONS
Masahito Iso, et al.; *Sensorless power assist method using impedance control considering load characteristics*, Technical Meeting on Industrial Instrumentation and Control, IEE, Japan, vol. IIC-02-40(2002, pp. 1-6.

*Primary Examiner* — Khoi Tran
*Assistant Examiner* — Jason Holloway
(74) *Attorney, Agent, or Firm* — Kenyon & Kenyon LLP (57) ABSTRACT

It is possible to provide a power assist device which can maintain a stable contact state without causing an oscillation phenomenon even if a robot is brought into contact with an environment. A method for controlling the power assist device is also provided. The power assist device includes: an inner force sensor which detects an operation force applied by an operator; an operation handle having the inner force sensor; a robot arm which supports the operation handle; an actuator which drives the robot arm; the actuator and a control device which measure or estimate a force applied when the robot arm is brought into contact with an environment; and the actuator and the control device which detect or estimate a motion speed of the operation handle. The control device acquires a corrected external force according to the operation force detected by the inner force sensor and an external force detected by the actuator and the control device as external force derivation means and controls the actuator so that the corrected external force acts on the operation handle.

4 Claims, 5 Drawing Sheets

U.S. PATENT DOCUMENTS

| | | | |
|---|---|---|---|
| 6,522,952 B1 * | 2/2003 | Arai et al. | 700/258 |
| 6,654,665 B2 * | 11/2003 | Arai et al. | 700/258 |
| 7,185,774 B2 * | 3/2007 | Colgate et al. | 212/331 |
| 2003/0135303 A1 * | 7/2003 | Arai et al. | 700/245 |
| 2010/0241274 A1 * | 9/2010 | Ohtera et al. | 700/245 |
| 2011/0040411 A1 * | 2/2011 | Murayama et al. | 700/260 |

FOREIGN PATENT DOCUMENTS

| | | |
|---|---|---|
| JP | 2005-14132 A | 1/2005 |
| JP | 2005-193339 A | 7/2005 |
| JP | 2005-306546 A | 11/2005 |
| JP | 2006-312207 A | 11/2006 |

\* cited by examiner

POWER ASSIST DEVICE AND ITS CONTROL METHOD

This is a 371 national phase application of PCT/JP2008/066212 filed 9 Sep. 2008, which claims priority to Japanese Patent Application No. 2007-237034 filed 12 Sep. 2007, the contents of which are incorporated herein by reference.

FIELD OF THE INVENTION

The present invention relates to a power assist device and its control method.

BACKGROUND OF THE INVENTION

Conventionally, at the scene of manufacture, a robot referred to as a power assist device is used so as to reduce labor and improve workability. As a control method of the power assist device, mechanical impedance control based on a position control (called an admittance control) is widely adopted.

In the admittance control, normally, position control with a high gain is performed and its target position is determined based on a force sensor. Then, force applied on the power assist device not through the force sensor is not considered at the control action, and a manipulator is hardly actuated. Namely, when the power assist device is brought into contact with an environment (the external) at the position except the detection part of the force sensor, the power assist device is continued to be actuated without consideration of the contact.

Hereafter, situations where humans and robots share a space will increase more and more so that the admittance control will consider the connection of a robot with a person or an environment The Non-patent Literature 1 shown below discloses a method of the admittance control with consideration of connection with an environment by using estimated value of external force acting on the power assist device not via any force sensor.

In the control method with consideration of the connection with the environment disclosed in the Non-patent Literature 1, compliant action following unknown external force can be realized. However, in this control method, there is known that, when an operator brings the robot into contact with the environment and then presses the robot to the environment further, the robot vibrates along the pressing direction and the anti-pressing direction (so-called oscillation phenomenon occurs). Essentially, the oscillation phenomenon should not occur in the state that the operation force is perfectly balanced with the external force. However, even slight difference between the two causes the oscillation phenomenon. The oscillation phenomenon becomes a problem in the case that the connection of the robot with the environment is premised such as pressing work with a power assist device.

For solving the problem, hitherto, such a method that an operator adjusts pressing condition of the power assist device is only obtained. With regard to parameters concerning the action of the power assist device, viscosity resistance is set to be increased so as to suppress the oscillation phenomenon. However, in this case, another problem occurs that the operation force required for the operation of the power assist device is increased so as to worsen the operability, whereby it is undesirable in practical use.

Namely, with regard to the conventional art, there is no method effective to suppress the oscillation phenomenon caused in the pressing work with the power assist device.

[Non-patent Literature 1]: Masahito Iso, Hirokazu Seki, and Yoichi Hori, Sensorless power assist method using impedance control considering load characteristics, Technical Meeting on Industrial Instrumentation and Control, IEE Japan, Vol. IIC-02-40 (2002)

SUMMARY OF INVENTION

Problems to be Solved by the Invention

The purpose of the present invention is to provide a power assist device which can maintain a stable contact state without causing an oscillation phenomenon even if a robot is brought into contact with an environment, and to provide a method for controlling the power assist device.

Means for Solving the Problems

The first aspect of the present invention is a power assist device which includes an operation part operated by an operator; an operation force detection means for detecting operation force applied on the operation part; a robot arm for supporting the operation part; a drive means for driving the robot arm; an external force measurement means for measuring force applied when the robot arm is brought into contact with an environment, or an external force estimation means for estimating force applied when the robot arm is brought into contact with the environment; and a speed detection means for detecting movement speed of the operation part, or a speed estimation means for estimating the movement speed of the operation part, wherein a control device is provided that obtains corrected external force based on the external force obtained by the external force measurement means or the external force estimation means and a component along the external force of the operation force detected by the operation force detection means, and controls the drive means so as to maintain the state that the operation force and the corrected external force act on the operation part and the component along the external force of the operation force and the corrected external force acting on the robot arm are always balanced with each other.

In an embodiment of the power assist device according to the present invention, preferably, the control device compares the component along the external force of the operation force detected by the operation force detection means with the external force obtained by the external force measurement means or the external force estimation means, regards the speed of the operation part calculated from the external force as speed of the operation part along the external force calculated from the component along the external force of the operation force so as to obtain the corrected external force when the component along the external force of the operation force is opposite to the external force and the external force is larger than the component along the external force of the operation force, and adopts the external force without any operation as the corrected external force when the component along the external force of the operation force has the same direction as the external force or the external force is smaller than the component along the external force of the operation force.

In another embodiment of the power assist device of the present invention, preferably, the control device compares the component along the external force of the operation force detected by the operation force detection means with the external force obtained by the external force measurement means or the external force estimation means, regards the external force as a component of the operation force along the external force so as to obtain the corrected external force when the component along the external force of the operation force is opposite to the external force and the external force is larger than the component along the external force of the operation force, and adopts the external force without any operation as the corrected external force when the component along the external force of the operation force has the same direction as the external force or the external force is smaller than the component along the external force of the operation force.

The second aspect of the present invention is a control method of a power assist device which includes an operation part operated by an operator; an operation force detection means for detecting operation force applied on the operation part; a robot arm for supporting the operation part; a drive means for driving the robot arm; an external force measurement means for measuring force applied when the robot arm is brought into contact with an environment, or an external force estimation means for estimating force applied when the robot arm is brought into contact with the environment; or an external force estimation means for estimating force applied when the robot arm is brought into contact with the environment; and a speed detection means for detecting movement speed of the operation part, or a speed estimation means for estimating the movement speed of the operation part, wherein corrected external force is obtained based on the external force obtained by the external force measurement means or the external force estimation means and a component along the external force of the operation force detected by the operation force detection means, and the drive means is controlled so as to maintain the state that the operation force and the corrected external force act on the operation part and the component along the external force of the operation force and the corrected external force acting on the robot arm are always balanced with each other.

In an embodiment of the control method of the power assist device according to the present invention, preferably, the speed along the external force of the operation part calculated from the component along the external force of the operation force detected by the operation force detection means is compared with the speed of the operation part calculated from the external force obtained by the external force measurement means or the external force estimation means, the speed of the operation part calculated from the external force is regarded as the speed along the external force of the operation part calculated from the component along the external force of the operation force so as to obtained the corrected external force when the speed along the external force of the operation part calculated from the component along the external force of the operation force is opposite to the speed of the operation part calculated from the external force and the speed of the operation part calculated from the external force is larger than the speed along the external force of the operation part calculated from the component along the external force of the operation force, and the external force without any operation is adopted as the corrected external force when the speed along the external force of the operation part calculated from the component along the external force of the operation force has the same direction as the speed of the operation part calculated from the external force or the speed of the operation part calculated from the external force is smaller than the speed along the external force of the operation part calculated from the component along the external force of the operation force.

In another embodiment of the control method of the power assist device according to the present invention, preferably, the component along external force of the operation force detected by the operation force detection means is compared with the external force obtained by the external force measurement means or the external force estimation means, the external force is regarded as a component of the operation force along the external force so as to obtain the corrected external force when the component along the external force of the operation force is opposite to the external force and the external force is larger than the component along the external force of the operation force, and the external force without any operation is adopted as the corrected external force when the component along the external force of the operation force has the same direction as the external force or the external force is smaller than the component along the external force of the operation force.

Effect of the Invention

According to the power assist device of the present invention, when the power assist device is brought into contact with the environment, the oscillation phenomenon is prevented and the stable connection state is maintained.

According to the power assist device of the present invention, instead of correcting the operation force, the external force is corrected to be limited so as to suppress the oscillation phenomenon on the power assist device without spoiling the operability.

According to the power assist device of the present invention, the oscillation phenomenon on the power assist device is suppressed more certainly without spoiling the operability.

According to the control method of the power assist device of the present invention, when the power assist device is brought into contact with the environment, the oscillation phenomenon is prevented and the stable connection state is maintained.

According to the control method of the power assist device of the present invention, instead of correcting the operation force, the external force is corrected to be limited so as to suppress the oscillation phenomenon on the power assist device without spoiling the operability.

According to the control method of the power assist device of the present invention, the oscillation phenomenon on the power assist device is suppressed more certainly without spoiling the operability.

DETAILED DESCRIPTION

Explanation will be given on the mode for carrying out the invention referring appended drawings.

Firstly, explanation will be given on a power assist device 1 and control method thereof according to an embodiment of the present invention referring work shown in FIG. 1 as an example.

Figure 1:
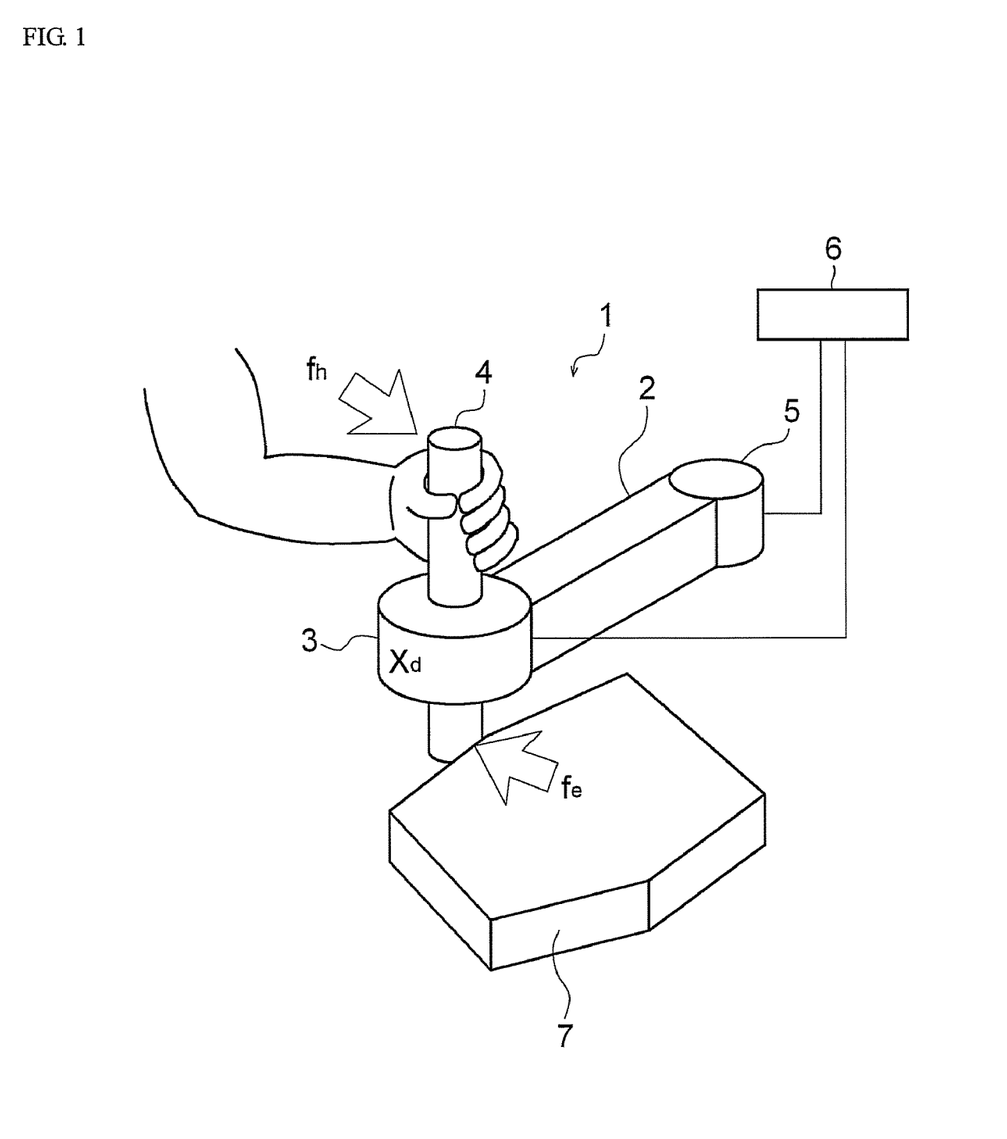
FIG. 1 It is a schematic drawing of state that a power assist device according to an embodiment of the present invention is brought into contact with an environment.

As shown in FIG. 1, the power assist device 1 includes a robot arm 2, an inner force sensor 3, an operation handle 4, an actuator 5, a control device 6 and the like.

The robot arm 2 is supported by the actuator 5 which is a drive means, and the robot device can assume various postures by the actuation of the actuator 5 following commands from the control device 6.

The operation handle 4 which is an operation part is disposed at the tip of the robot arm 2 through the inner force sensor 3 which is an operation force detection means, and an operator can moves the robot arm 2 to a desired position by holding the operation handle 4. The operation force applied on the operation handle 4 by the operator at the time of the movement is detected by the inner force sensor 3.

The actuator 5 can not only support and drive the robot arm 2 but also detect the posture of the robot arm 2 and detect the operation speed of the operation handle 4 as an operation speed detection means.

Based on the information of posture of the robot arm 2 and the information of operation speed of the operation handle 4 detected by the actuator 5, the control device 6 which acts as an external force estimation means and an operation speed estimation means estimates external force (contact force) applied on the robot arm 2 by an environment.

Though estimated value estimated by the control device 6 is adopted as the external force applied by the environment, it may alternatively be constructed that a force sensor which is an external force measurement means for connection detection is provided separately and actual measurement value is adopted as the external force applied by the environment.

When the robot arm 2 is brought into contact with the environment (for example, an obstacle 7), operation force $f_h$ by an operator and external force $f_e$ by the obstacle 7 act on the robot arm 2. In admittance control, the operation force $f_h$ and the external force $f_e$ are detected or estimated, and based on the detected values or estimated values, target tip position $x_{dm}$ at which desired impedance is realized is calculated by the control device 6. Then, the control device 6 controls the actuator 5 for driving the robot arm 2 so as to move tip position $x_d$ of the robot arm 2 to the target tip position $x_{dm}$.

In the state shown in FIG. 1, based on the information obtained by estimating (or directly measuring) the operation force $f_h$ and the external force $f_e$, a formula 1 shown below is materialized.

$$\alpha f_h + f_e = M\ddot{x}_d + D\dot{x}_d \qquad \text{[Formula 1]}$$

In the above formula, α indicates assist ratio, M indicates inertial force, and D indicates viscous force. In below explanation, for simplifying the explanation, it is assumed that α=1.

In the case of calculating the target tip position $x_{dm}$ with the information of a plurality of force (that is, the operation force $f_h$ and the external force $f_e$) as mentioned above, the resultant of the plurality of force must be "zero" and balanced so as to set the target tip position $x_{dm}$ to a fixed value.

Delay of force detection by the inner force sensor 3, delay caused by time for calculation must be considered so as to obtain the target tip position $x_{dm}$, set to a fixed value, by the control device 6.

In an embodiment of the control method of the power assist device 1, a control method that the external force $f_e$ used in the calculation with the formula 1 is corrected corresponding to the state of the operation force $f_h$ and the external force $f_e$ so as to prevent an oscillation phenomenon from being caused on the power assist device 1. Explanation will be given on the concrete control method.

In an one-dimensional model, in the state that the tip position $x_d$ moves at speed $V_d$, when the operation force $f_h$ acts, a formula 2 shown below is materialized and speed $V_a$ is obtained.

$$V_a = V_d + Tf_h / M \qquad \text{[Formula 2]}$$
$$= \dot{x}_d + Tf_h / M \, (V_d = \dot{x}_d)$$

In the above formula, T indicates sampling time.

When the speed $V_a$ and the external force $f_e$ have the same direction (that is, $V_a * f_e > 0$), the external force $f_e$ is adopted as corrected external force $f_{es}$ without any operation. When the speed $V_a$ and the external force $f_e$ have opposite directions (that is, $V_a * f_e < 0$), the corrected external force $f_{es}$ is obtained with a formula 3 shown below.

$$f_{es} = \begin{cases} -V_a M / T + DV_a & \ldots \text{ if } |V_a| \le |f_e - DV_a|T/M \\ f_e & \ldots \text{ otherwise} \end{cases} \qquad \text{[Formula 3]}$$

Accordingly, the next target tip position $x_{dm}$ of the operation part is obtained from the operation force $f_h$ and the corrected external force $f_{es}$, and the operation force $f_h$ and the corrected external force $f_{es}$ are maintained to be balanced with each other, whereby the calculation result of the target tip position $x_{dm}$ is not oscillated and the stable connection state is maintained.

Next, explanation will be given on a control flow of admittance control according to the present invention referring FIG. 2.

Figure 2:
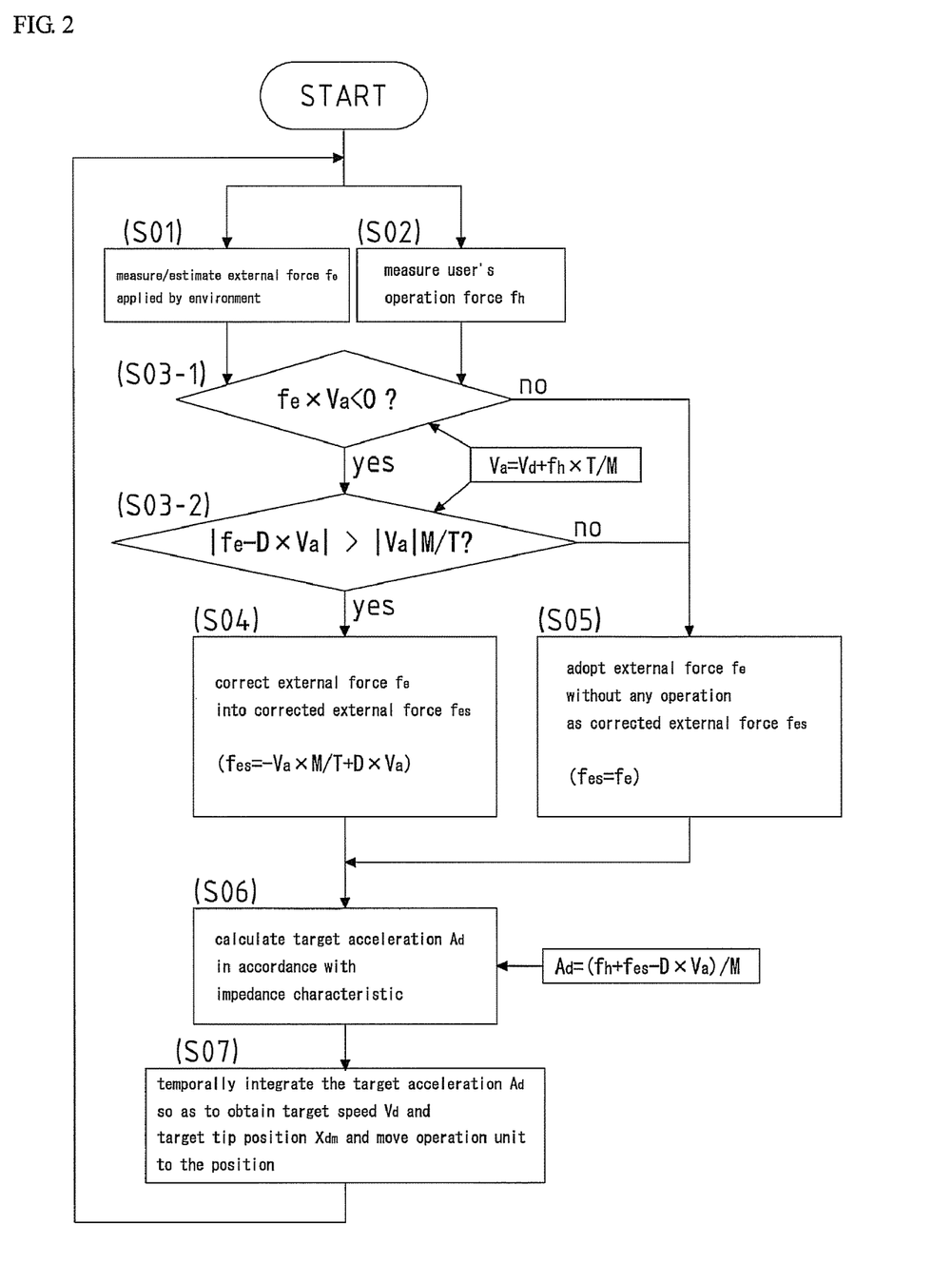
FIG. 2 It is a flow chart of admittance control according to the embodiment of the present invention.

As shown in FIG. 2, in the control method of the power assist device according to the embodiment of the present invention, when control action is started, firstly, the external force $f_e$ from the environment is measured or estimated (S01) and the operation force $f_h$ from an operator is measured (S02).

Next, based on the external force $f_e$ and the operation force $f_h$ obtained at the steps (S01) and (S02), the control device 6 judges conditions (S034 and S03-2), and the control flow advances to a step (S04) in the case that both the steps (S03-1) and (S03-2) are satisfied and the control flow advances to a step (S05) in the other cases.

At the step (S04), the external force $f_e$ is corrected to the corrected external force $f_{es}$ so as to make the next target speed "zero". Since the speed $V_d$ at the time that the robot arm 2 is brought into contact with the environment is about "zero", the above control can be regarded that the external force $f_e$ is limited to the corrected external force $f_{es}$ so as to prevent vibration of the robot arm 2.

At the step (S05), the external force $f_e$ is adopted as the corrected external force $f_{es}$ without any operation.

Based on the corrected external force $f_{es}$ obtained at the step (S04) or (S05), the control device 6 calculates target acceleration $A_d$ (S06), and the obtained target acceleration $A_d$ is temporally integrated so as to calculate the target speed $V_d$ and the target tip position (S07), and then the control device 6 controls the drive of the actuator 5, which supports the robot arm 2, so as to materialize the target speed $V_d$ and the target tip position $x_{dm}$. Each of calculating processes shown in FIG. 2 is performed by the control device 6.

The target acceleration $A_d$ is obtained with below formula 4.

$$A_d = (f_h + f_{es} - D \cdot V_d)/M \quad \text{[Formula 4]}$$

The power assist device 1 includes: the inner force sensor 3 which detects the operation force applied by an operator; the operation handle 4 having the inner force sensor 3; the robot arm 2 which supports the operation handle 4; the actuator 5 which drives the robot arm 2; the actuator 5 and the control device 6 which measure or estimate the force applied when the robot arm 2 is brought into contact with an environment; and the actuator 5 and the control device 6 which detect or estimate the movement speed of the operation handle 4. In the control method of the power assist device 1, the corrected external force $f_{es}$ is obtained based on the operation force $f_h$ detected by the inner force sensor 3 and the external force $f_e$ obtained by the actuator 5 and the control device 6, and the actuator 5 is controlled so that the corrected external force $f_{es}$ acts on the operation handle 4.

According to the above construction, when the robot arm 2 is brought into contact with the environment (the obstacle 7), the oscillation phenomenon on the power assist device 1 is prevented and the stable connection state is maintained.

The operation force $f_h$ detected by the inner force sensor 3 is compared with the external force $f_e$ obtained by the actuator 5 and the control device 6. When the external force $f_e$ is larger than the operation force $f_h$, the external force $f_e$ is limited to be not larger than the operation force $f_h$ so as to obtain the corrected external force $f_{es}$, and when the operation force $f_h$ is larger than the external force $f_e$, the external force $f_e$ is adopted without any operation so as to obtain the corrected external force $f_{es}$.

Accordingly, instead of correcting the operation force $f_h$, the external force $f_e$ is corrected to be limited so as to suppress the oscillation phenomenon on the power assist device 1 without spoiling the operability.

Furthermore, when the operation force $f_h$ detected by the actuator 5 and the control device 6 has opposite direction to the external force $f_e$ obtained by the actuator 5 and the control device 6 and the external force $f_e$ is larger than a predetermined threshold, the external force $f_e$ is limited to make the speed calculated from the operation force $f_h$ and the external force $f_e$ "zero" so as to obtain the corrected external force $f_{es}$, and when the external force $f_e$ is smaller than the predetermined threshold or has the same direction as the operation force $f_h$, the external force $f_e$ is adopted without any operation as the corrected external force $f_{es}$.

Accordingly, by setting the threshold so as to provide a dead band in the control action, the oscillation phenomenon on the power assist device 1 is suppressed more certainly without spoiling the operability.

The control method of the power assist device according to the embodiment of the present invention is not limited to be adopted to a one-dimensional model and is adoptable to a multidimensional model.

Figure 3:
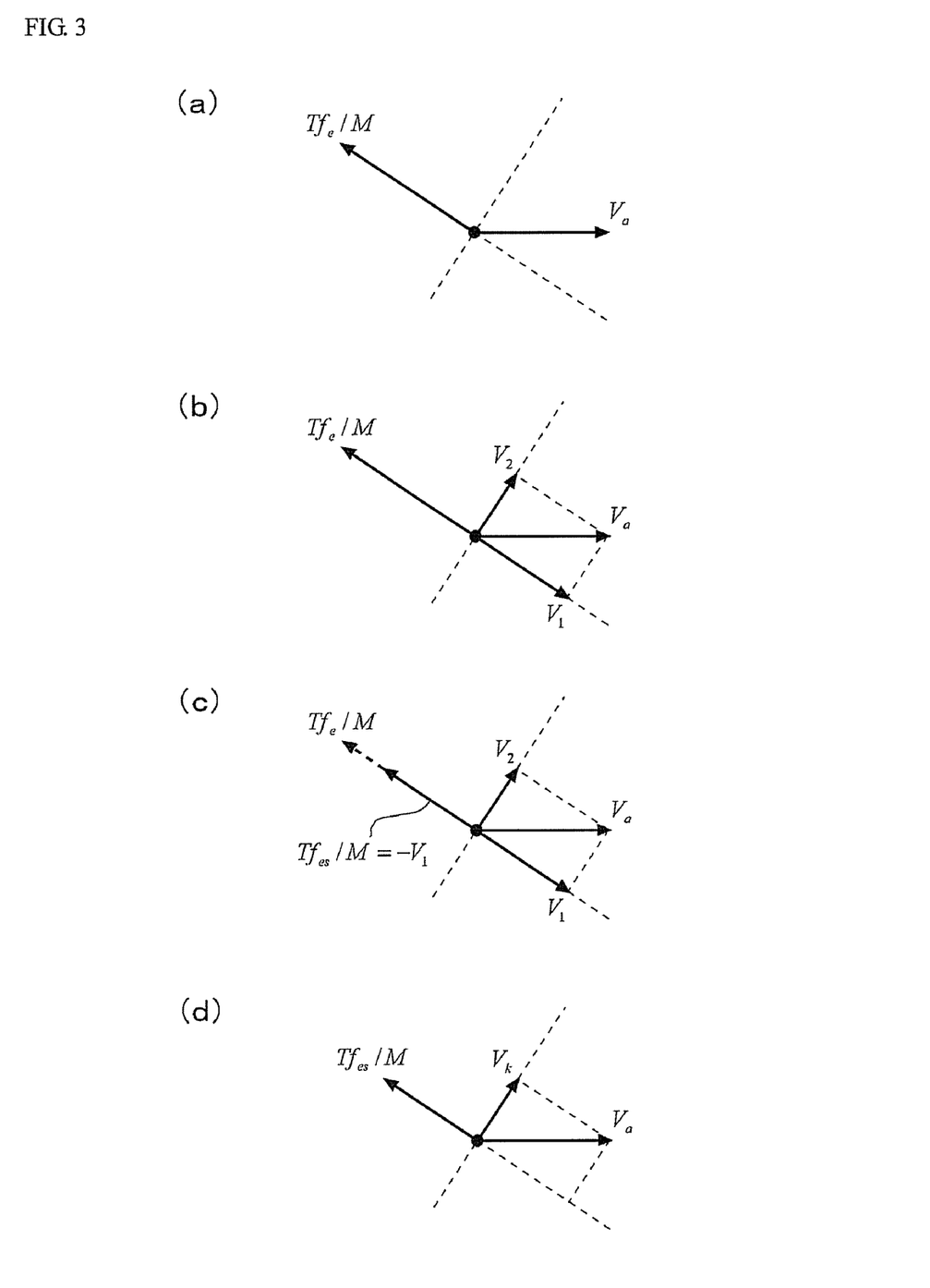
FIG. 3 It is a speed vector diagram for explaining application of the present invention to a multidimensional system. (a) is a first speed vector diagram, (b) is a second speed vector diagram, (c) is a third speed vector diagram, and (d) is a fourth speed vector diagram.

Explanation will be given on the case that the control method of the power assist device according to the embodiment of the present invention is adopted to a multidimensional model referring FIG. 3. Herein, for simplifying the explanation, it is assumed that viscous force D=0.

As shown in FIG. 3(a), in the state that a speed vector $V_a$ by the operation force and a speed vector $Tf_e/M$ obtained from the external force exist as an example, the speed vector $V_a$ by the operation force obtained with the formula 2 can be indicated as FIG. 3(b) by dividing it into components ($V_1, V_2$) of the direction of the speed vector $Tf_e/M$ obtained from the external force and the direction perpendicular thereto.

As shown in FIG. 3(c), when the speed vector $Tf_e/M$ has opposite direction to $V_1$ and is larger than $V_1$, the speed vector $Tf_e/M$ is corrected and the corrected speed vector $Tf_e/M$ is referred to as $-V_1$.

Then, as shown in FIG. 3(d), the movement direction finally obtained from the operation force and the corrected external force is $V_k$. Namely, any force does not act along the direction of the external force from the environment so that the oscillation is prevented.

The operation force applied along a tangent of the environment (that is, the operation of moving the power assist device along the tangent of the outer edge of the environment) is not prevented.

Figure 4:
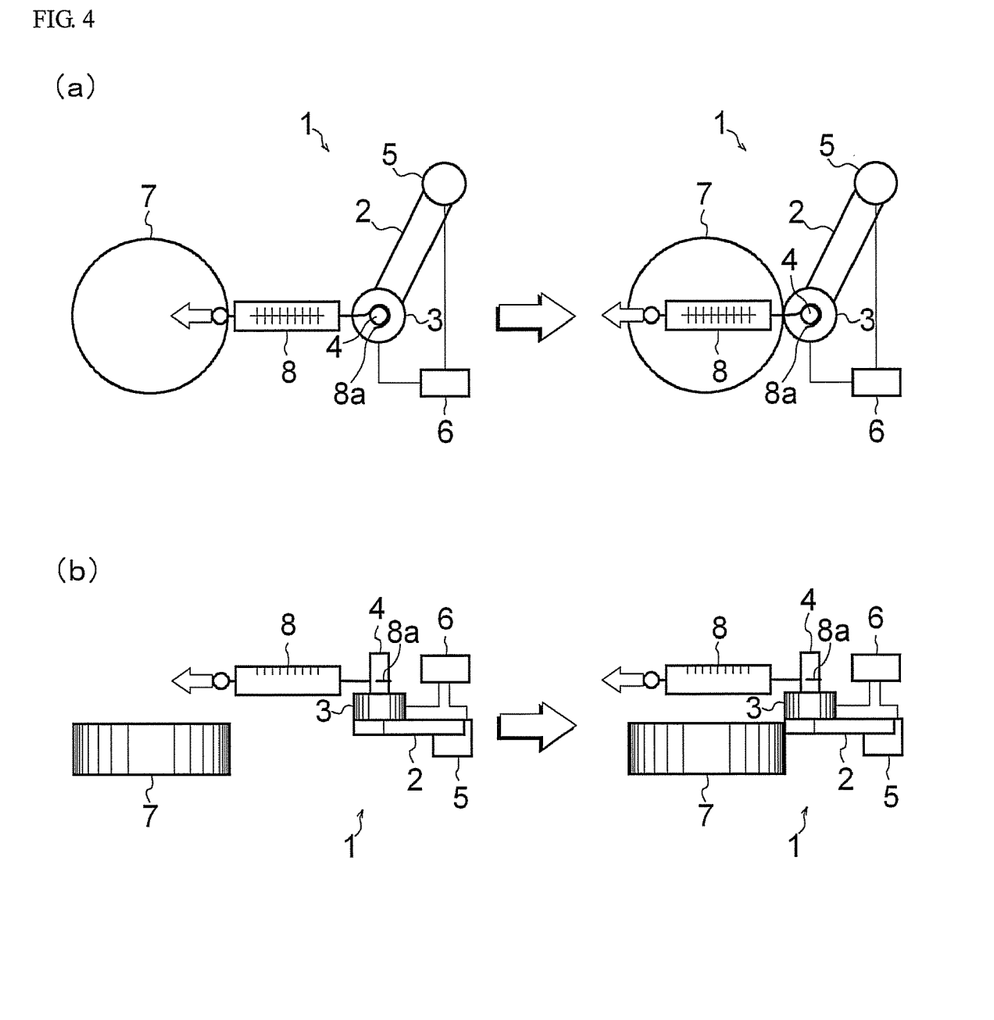
FIG. 4 It is a schematic drawing of an experimental device for confirming effect of application of the present invention. (a) is a plan view and (b) is a side view.
Figure 5:
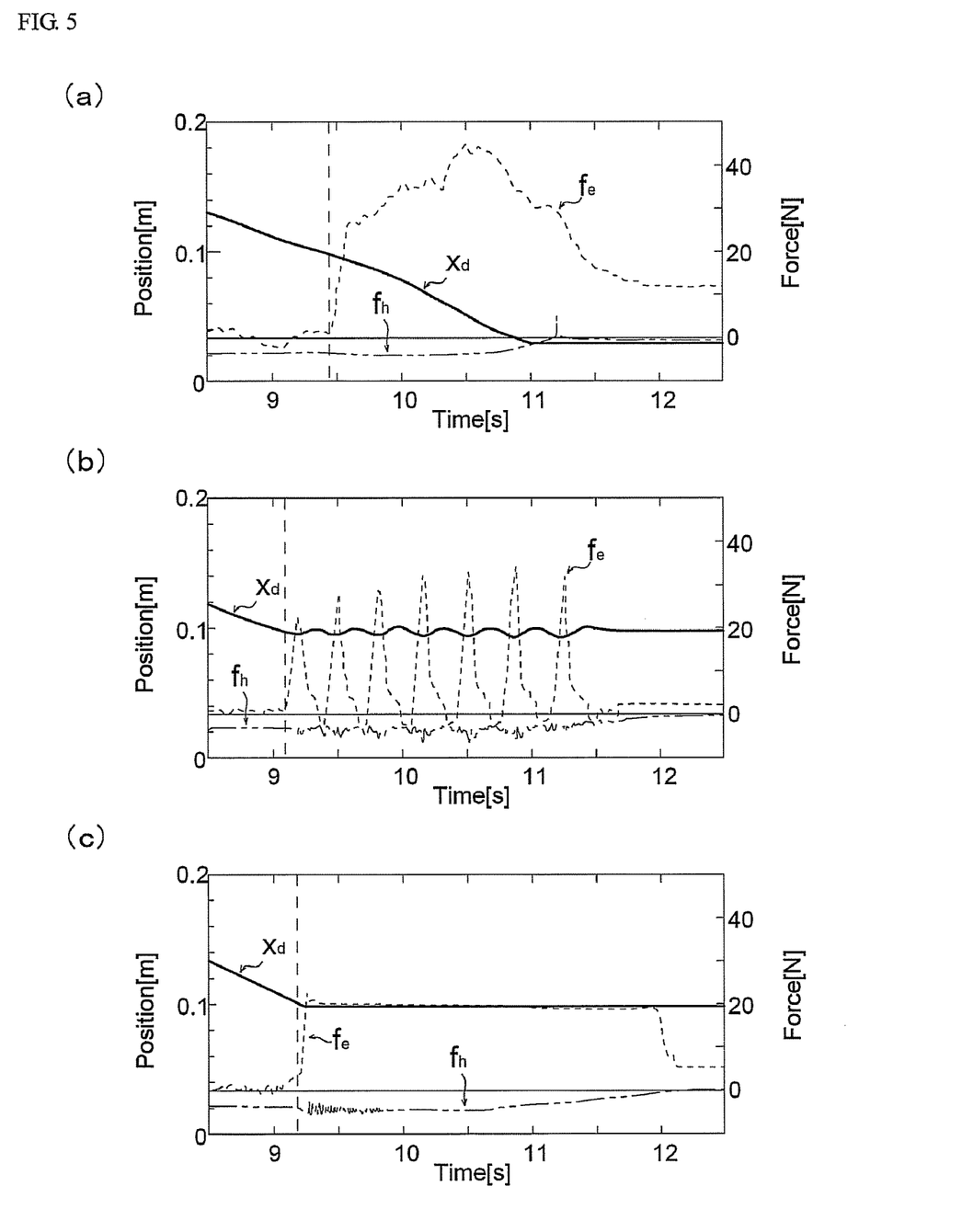
FIG. 5 It is a graph of variation with time of tip position, operation force and estimated external force at the admittance control. (a) shows an experimental result of the normal admittance control (with only the information of operation force), (b) shows an experimental result of the conventional admittance control (with the information of operation force and estimated external force), and (c) shows an experimental result of the admittance control according to the embodiment of the present invention.

Next, explanation will be given on experimental results for confirming effect of adoption of the control method of the power assist device according to the embodiment of the present invention referring FIGS. 4 and 5.

As shown in FIGS. 4(a) and (b), in the power assist device 1, the inner force sensor 3 is disposed at the tip position of the robot arm 2, and the operation handle 4 is disposed at the tip position of the robot arm 2 through the inner force sensor 3.

An experimental device is constructed that a hook 8a of a spring balance 8 is hanged on the operation handle 4 and an operator pulls the operation handle 4 via the spring balance 8 so as to displace the robot arm 2.

When the operator pulls the operation handle 4 via the spring balance 8, the robot arm 2 is brought into contact with the environment (the obstacle 7), and the inner force sensor 3 detects the operation force $f_h$ at the time of the contact of the robot arm 2 with the obstacle 7. The estimated external force $f_e$ by the contact and the tip position $x_d$ are obtained by calculation based on information of position obtained from the actuator 5 driving the robot arm 2 and the like.

The experimental results with the above experimental device are shown in FIGS. 5(a), (b) and (c). In each of FIGS. 5(a), (b) and (c), the axis of abscissas indicates time (s), and a dotted line shown at the position just after the time 9 (s) in the graph indicates the timing of the contact of the robot arm 2 with the environment (the obstacle 7).

Firstly, explanation will be given on the experimental result of normal admittance control (namely, the robot arm 2 is assist-controlled with only the information of the operation force $f_h$).

As shown in FIG. 5(a), in this case, after the contact of the robot arm 2 with the environment (the obstacle 7), the tip position $x_d$ and the operation force $f_h$ have been changing while the contact scarcely affects them.

On the other hand, the estimated external force $f_e$ by the contact which is not used for the control changes widely so that it is obtained that the robot arm 2 may break the environment in this control method.

Next, explanation will be given on the experimental result of the admittance control further considering the information of the estimated external force $f_e$ by the contact (namely, the robot arm 2 is assist-controlled with the information of the operation force $f_h$ and the estimated external force $f_e$ by the contact).

As shown in FIG. 5(b), in this case, after the contact of the robot arm 2 with the environment (the obstacle 7), the tip position $x_d$ does not make an inroad into the environment further, and it is obtained that the oscillation phenomenon occurs according to the change of the estimated external force $f_e$ by the contact.

In this case, though the oscillation phenomenon can be prevented by weakening the pressing force of the robot arm 2 to the environment (the obstacle 7) by the skill of the operator, this operation requires delicate adjustment of the force.

Finally, explanation will be given on the experimental result of the admittance control to which the control method of the power assist device according to the embodiment of the present invention is adopted so that the estimated external force $f_e$ by the contact is corrected and the information of the corrected external force $f_{es}$ is considered.

FIG. 5(c) shows the experimental result of the admittance control according to the present invention (namely, the robot arm 2 is assist-controlled with the information of the external force $f_e$ corrected corresponding to the operation force $f_h$ (the corrected external force $f_{es}$)).

In this case, the tip position $x_d$ does not oscillate and is stable at a fixed position from the time at which the robot arm 2 is brought into contact with the environment (the obstacle 7) to the time at which the robot arm 2 reaches the pressing state, whereby it is confirmed that the stable contact state is maintained.

Accordingly, by adopting the control method of the power assist device according to the embodiment of the present invention, even if the robot is in contact with the environment, the oscillation phenomenon does not occur on the power assist device, whereby the power assist device can be provided that the stable contact state is maintained at the pressing work.

INDUSTRIAL APPLICABILITY

The power assist device and the control method thereof according to the present invention can be used not only for a power assist device provided in an assembly line of a motor-car or the like but also for various uses widely in which a power assist device is used.

The invention claimed is:

1. A power assist system comprising
an operation part operated by an operator;
an operation force detection device that detects operation force applied on the operation part;
a robot arm that supports the operation part;
a drive mechanism that drives the robot arm;
an external force measurement device that measures force applied when the robot arm is brought into contact with an environment, or an external force estimation device that estimates force applied when the supporting part is brought into contact with the environment; and
a speed detection device that detects movement speed of the operation part, or a speed estimation device that estimates the movement speed of the operation part,
wherein a control device is provided that obtains a corrected external force based on the external force obtained by the external force measurement device or the external force estimation device and a component along the external force of the operation force detected by the operation force detection device, controls the drive mechanism so as to maintain the state that the operation force and the corrected external force act on the operation part and the component along the external force of the operation force and the corrected external force acting on the robot arm are always balanced with each other, compares the component along the external force of the operation force detected by the operation force detection device with the external force obtained by the external force measurement device or the external force estimation device, regards the speed of the operation part calculated from the external force as speed of the operation part along the external force calculated from the component along the external force of the operation force so as to obtain the corrected external force when the component along the external force of the operation force is opposite to the external force and the external force is larger than the component along the external force of the operation force, and adopts the external force without any operation as the corrected external force when the component along the external force of the operation force has the same direction as the external force or the external force is smaller than the component along the external force of the operation force.

2. A power assist system comprising comprising
an operation part operated by an operator;
an operation force detection device that detects operation force applied on the operation part;
a robot arm that supports the operation part;
a drive mechanism that drives the robot arm;
an external force measurement device that measures force applied when the robot arm is brought into contact with an environment, or an external force estimation device that estimates force applied when the robot arm is brought into contact with the environment; and
a speed detection device that detects movement speed of the operation part, or a speed estimation device that estimat6es the movement speed of the operation part,
wherein a control device is provided that obtains a corrected external force based on the external force obtained by the external force measurement device or the external force estimation device and a component along the external force of the operation force detected by the operation force detection device, controls the drive mechanism so as to maintain the state that the operation force and the corrected external force act on the operation part and the component along the external force of the operation force and the corrected external force acting on the robot arm are always balanced with each other, compares the component along the external force of the operation force detected by the operation force detection device with the external force obtained by the external force measurement device or the external force estimation device, regards the external force as a component of the operation force along the external force so as to obtain the corrected external force when the component along the external force of the operation force is opposite to the external force and the external force is larger than the component along the external force of the operation force, and adopts the external force without any operation as the corrected external force when the component along the external force of the operation force has the same direction as the external force or the external force is smaller than the component along the external force of the operation force.

3. A control method of a power assist device comprising:
an operation part operated by an operator;
an operation force detection device that detects operation force applied on the operation part;
a robot arm that supports the operation part;
a drive mechanism that drives the robot arm;
an external force measurement device that measures force applied when the robot arm is brought into contact with an environment, or an external force estimation device that estimates force applied when the robot arm is brought into contact with the environment; and a speed detection device that detects movement speed of the operation part, or a speed estimation device that estimates the movement speed of the operation part, wherein a corrected external force is obtained based on the external obtained by the external force measurement device or the external force estimation device and a component along the external force of the operation force detected by the operation force detection device, the drive mechanism is controlled so as to maintain the state that the operation force and the corrected external force act on the operation part and the component along the external force of the operation force and the corrected external force acting on the robot arm are always balanced with each other, the speed along the external force of the operation part calculated from the component along the external force of the operation force detected by the operation force detection device is compared with the speed of the operation part calculated from the external force obtained by the external force measurement device or the external force estimation device, the speed of the operation part calculated from the external force is regarded as the speed along the external force of the operation part calculated from the component along the external force of the operation force so as to obtain the corrected external force when the speed along the external force of the operation part calculated from the component along the external force of the operation force is opposite to the speed of the operation part calculated from the external force and the speed of the operation part calculated from the external force is larger than the speed along the external force of the operation part calculated from the component along the external force of the operation force, and the external force without any operation is adopted as the corrected external force when the speed along the external force of the operation part calculated from the component along the external force of the operation force has the same direction as the speed of the operation part calculated from the external force or the speed of the operation part calculated from the external force is smaller than the speed along the external force of the operation part calculated from the component along the external force of the operation force.

4. A control method of a power assist device comprising:
an operation part operated by an operator;
an operation force detection device that detects operation force applied on the operation part;
a robot arm that supports the operation part;
a drive mechanism that drives the robot arm;
an external force measurement device that measures force applied when the robot arm is brought into contact with an environment, or an external force estimation device that estimates force applied when the supporting part is brought into contact with the environment; and
a speed detection device that detects movement speed of the operation part, or a speed estimation device that estimates the movement speed of the operation part, wherein a corrected external force is obtained based on the external force obtained by the external force measurement device or the external force estimation device and a component along the external force of the operation force detected by the operation force detection device, the drive means is controlled so as to maintain the state that the operation force and the corrected external force act on the operation part and the component along the external force of the operation force and the corrected external force acting on the robot arm are always balanced with each other, the component along the external force of the operation force detected by the operation force detection device is compared with the external force obtained by the external force measurement device or the external force estimation device, the external force is regarded as a component of the operation force along the external force so as to obtain the corrected external force when the component along the external force of the operation force is opposite to the external force and the external force is larger than the component along the external force of the operation force, and the external force without any operation is adopted as the corrected external force when the component along the external force of the operation force has the same direction as the external force or the external force is smaller than the component along the external force of the operation force.

* * * * *

UNITED STATES PATENT AND TRADEMARK OFFICE
CERTIFICATE OF CORRECTION

PATENT NO. : 8,280,552 B2
APPLICATION NO. : 12/677652
DATED : October 2, 2012
INVENTOR(S) : Naoyuki Takesue et al.

Page 1 of 1

It is certified that error appears in the above-identified patent and that said Letters Patent is hereby corrected as shown below:

In the Specifications:

Column 5, line 55, change "a indicates" to --α indicates--;

Column 6, line 49, change "(5034" to --(503_1--;

Column 6, line 66, change "position (507)" to --position $X_{dm}$ (507)--;

In the Claims:

Column 10, line 16, change "comprising comprising" to --comprising--;

Column 10, line 29, change "estimat6es" to --estimates--;

Signed and Sealed this
Twenty-third Day of April, 2013

Teresa Stanek Rea
*Acting Director of the United States Patent and Trademark Office*